Jan. 18, 1966 T. G. LANG 3,229,458
PULSE-TYPE PROPULSION SYSTEM FOR WATER CRAFT
Filed April 24, 1964 2 Sheets-Sheet 1
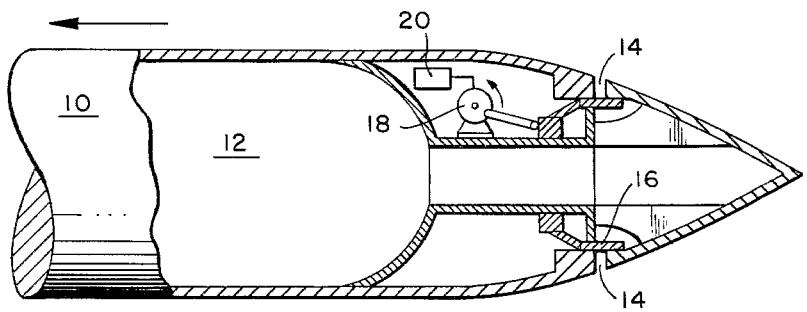
FIG. 1.
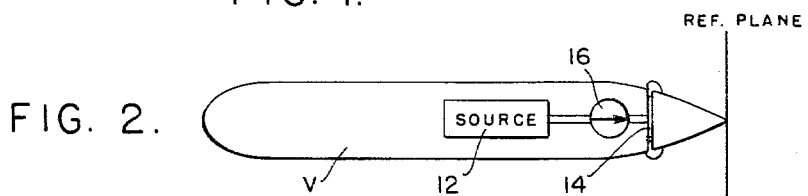
FIG. 2.
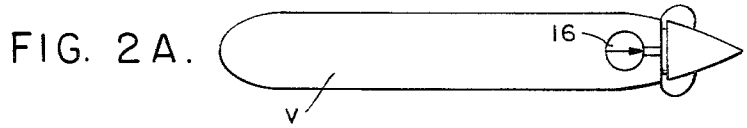
FIG. 2A.
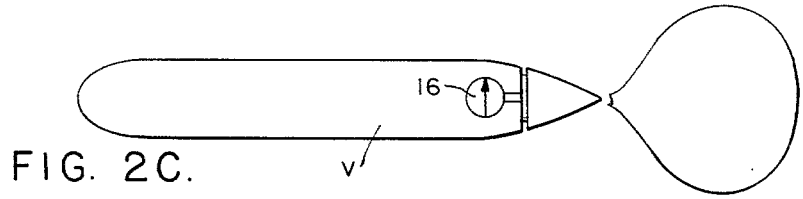
FIG. 2B.
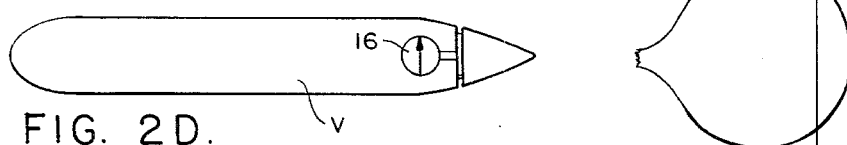
FIG. 2C.
FIG. 2D.
INVENTOR.
THOMAS G. LANG
BY
ATTORNEY.

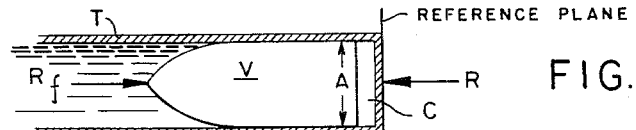
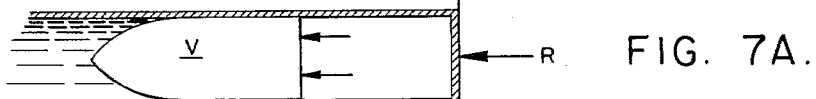
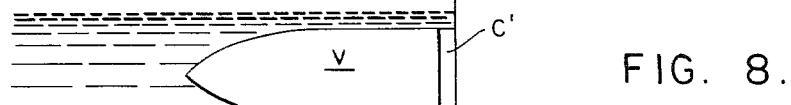
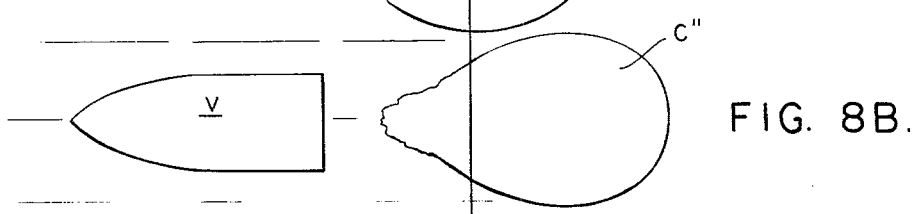
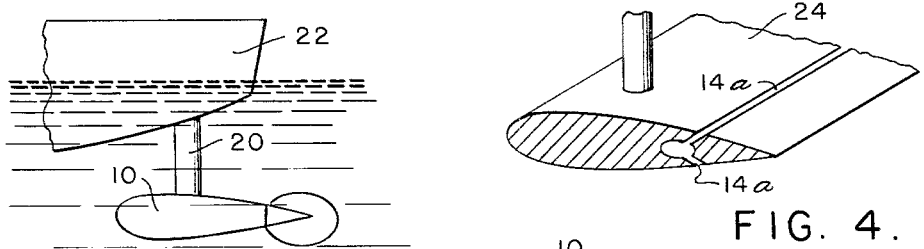
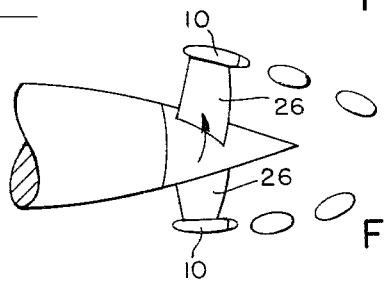
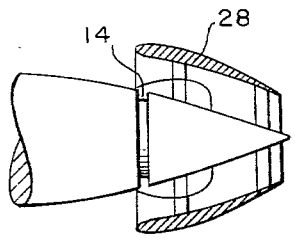
INVENTOR.
THOMAS G. LANG

3,229,458
PULSE-TYPE PROPULSION SYSTEM FOR WATER CRAFT
Thomas G. Lang, South Pasadena, Calif., assignor to the United States of America as represented by the Secretary of the Navy
Filed Apr. 24, 1964, Ser. No. 362,531
9 Claims. (Cl. 60—35.5)
(Granted under Title 35, U.S. Code (1952), sec. 266)

The invention described herein may be manufactured and used by or for the Government of the United States of America for governmental purposes without the payment of any royalties thereon or therefor.

This invention relates to underwater bodies and more particularly to improvements in method and apparatus for propelling same through water. Examples of underwater bodies or vehicles which may employ the invention include torpedoes, submerged propulsion pods, hydrofoils and submarines.

Rotating propellers have long been employed for propelling both surface and submerged vehicles and still remain as the conventional mode of propulsion despite the complications involved in converting a source of energy into torque energy. More recently, however, various devices have been proposed or used which convert such energy more directly into thrust energy by jets and the like. Such devices are exemplified by patents such as 2,932,943 issued to Zwicky and 2,903,850 issued to Lang. In these devices the energy of a fuel is transformed into intermittent water pulse jets which, due to their rearwardly moving masses, propel a vehicle forward by jet reaction. The patent to Rider, 2,486,495, operates on a like jet reaction principal in which slugs of water are intermittently moved rearwardly from a chamber by expansion of air and expanding steam. In any of these devices the propulsion force is a function of the mass of water moved times its velocity. The present invention carries forward such simplification of energy conversion but without accelerating masses or slubs of water through a discrete chamber. Also, the principle of operation differs from jet reaction in that a pressure recovery principle is employed wherein the pressure of an expanding gas operates against a cross section of a vehicle to propel it.

One of the objects of the invention is to provide apparatus and method for producing thrust on a submerged vehicle which is less complex than those heretofore proposed or employed.

Another object to produce such thrust with a novel mode of operation.

Another object is to propel a submerged body by intermittent discharges of high pressure gas which, due to their expansion in the water, produce direct thrust on the outer surface of the body.

A further object is to time the discharges of gas in such manner that trailing expanding bubbles of gas are spaced apart discrete distances and out of communication with each other.

Still further objects, advantages and salient features will become more apparent from a consideration of the accompanying description, the appended claims, and the attached drawings, in which:

FIG. 1 is a cross section of the rear end of an underwater vehicle, such as a torpedo, submarine, or propulsion pod, portions being shown diagrammatically, illustrating one form of the invention;

FIGS. 2, 2A, 2B, 2C and 2D are side elevations of FIG. 1 illustrating successive positions of movement of the vehicle through water;

FIG. 3 is a side elevation of a surface boat, utilizing the principle of FIGS. 1 and 2 to 2D;

FIG. 4 is a perspective of a hydrofoil utilizing the same principle;

FIG. 5 is a side elevation of a propeller, rotated by the same principle;

FIG. 6 is a side elevation, partly in section, of an alternate form of FIG. 1;

FIGS. 7 and 7A illustrate principles analogous to the invention; and

FIGS. 8, 8A and 8B illustrate the principles of the invention.

As previously referred to, the operation of this invention depends upon the principles of expanding a gas in contact with a movable vehicle. This principle can probably be most easily understood by reference to an analogy illustrated in FIG. 7 wherein a vehicle V is disposed within a flooded tube T closed at one end, the tube being restrained against movement in one direction by a resisting force R. Now, if a gas under pressure is introduced into chamber C it will expand and the vehicle will move away from its original reference point as illustrated in FIG. 7A since the only possible direction of expansion of the gas is in the direction of vehicle movement. A well known example of the foregoing is the firing of a torpedo from a torpedo tube by compressed air delivered to the rear end of the torpedo tube. FIG. 8 is analogous to FIG. 7 except that the tube is no longer present. When gas is delivered to the rear end of the vehicle it again expands in a water enveloped chamber C', its direction of expansion being rearwardly, to some extent, as resisted by the water but also in the direction of movement of the vehicle. The expansion chamber C' therefore increases in length in both the direction of missile mevement and in the rearward direction. Expansion also takes place in radially outward directions against the resistance of the water as shown by the bulging bubble. As will be apparent, the instantaneous force acting on the vehicle tending to propel it is the pressure P in C' times the cross sectional area A of the vehicle. For maximum efficiency, bulging of the bubble and its rearward growth or movement should be minimized to thereby effect the maximum amount of gas expansion in the direction of vehicle movement to thus approach, as nearly as possible, the ideal analogy as illustrated in FIGS. 7 and 7A.

At some point of the forward movement of the vehicle, away from the position of FIG. 8, delivery of gas to chamber C' must cease, permitting a desired expansion of the gas. When expansion in contact with area A ceases the bubble separates from the rear end of the vehicle, if properly streamlined, as indicated by C" in FIG. 8B. The vehicle, being in motion, then coasts through the water for a certain distance until gas is again admitted behind the vehicle to produce the next pulse or exterior expansion chamber which, as will be apparent, does not communicate with the preceding bubble. The vehicle thus experiences a sequence of acceleration and coasts deviating from a constant velocity. Preferably, this deviation should be minimized to provide a nearly constant thrust and to optimize efficiency.

It will now be apparent that the basic elements of the invention are a vehicle, a source of gas pressure, a suitable exhaust duct properly located in the vehicle and suitable valving to intermittently communicate the source of pressure with the exhaust duct. As will subsequently appear, the pulses of gas pressure must be of relatively high frequency, thus requiring a valve which may be rapidly opened and closed and remain closed until the next cycle of gas delivery. Since such type of valve, per se, does not constitute a part of the invention and since the selection of the proper type of valve would be within the province of those skilled in the art, a simplified arrangement of parts, shown somewhat diagrammatically, has been chosen for illustration in the interests of simplification of disclosure, which will now be described.

Referring now to FIG. 1, vehicle 10 may be considered as a torpedo having a gas pressure chamber 12 which may communicate with an annular slot 14 when valve 16 is moved to open position. Valve 16 may be reciprocated by any suitable power operated actuator 18, the frequency of its operation preferably being controlled by a timer 20, which may vary the frequency of the pulses of gas delivered through slot 14.

FIGS. 2 to 2D illustrate the various positions of movement of the vehicle away from a reference plane. In FIG. 2 the vehicle is coasting from the force exerted by the previous pulse of gas and valve 16 has just opened, delivering a generally toroidal volume of gas encircling the vehicle. In FIG. 2A the valve is still open increasing the volume of gas. In FIG. 2B the valve has closed and the bubble of gas has expanded to engulf the entire rear end of the vehicle. In FIG. 2C it has expanded further, and substantially to depth pressure at which point it separates from the vehicle. The vehicle then coasts, FIG. 2D, to a new position where the valve again opens, as in FIG. 2. The vehicle thus leaves behind it a trail of bubbles separated from each other by bodies of water.

Sources of gas pressure which may be employed include a reservoir of high pressure gas, such as air, a combustion chamber in which high pressure gas is produced by rocket or other fuels, a water reactive fuel, or other.

The location of the exhaust conduit is somewhat critical and should be near the rear end of the vehicle since it will now become apparent that if it is placed well forward, the bubble may produce thrust in the wrong direction or insufficient thrust in the forward direction.

The location of the valve is also somewhat critical to obtain maximum efficiency and should be as close as practicable, as shown in FIG. 1, to the exhaust conduit so that the expansion conduit volume is not excessive within the vehicle.

Various applications of the invention have been previously mentioned. A vehicle 10, such as shown in FIG. 1, may be attached by a suitable strut 20 to a surface vessel 22 as shown in FIG. 3. FIG. 4 illustrates a boat hydrofoil 24 having slots 14a, 14a near its trailing edge which perform the function of slot 14 in FIG. 1. The bubble in this case will be elongated in the lateral direction of the hydrofoil and will provide pressure across the lateral cross section of the hydrofoil. FIG. 5 illustrates small propulsion pods 10, like FIG. 1, attached to the tips of propeller blades 26 for rotating them, the rotation of the blades providing the propulsion force in the conventional manner. In lieu of pods on the blades, their trailing edges may be provided with slots or apertures to form the bubbles in the same manner as the hydrofoil of FIG. 4.

FIG. 6 illustrates another modification in which the rear end of a vehicle, such as shown in FIG. 1, is provided with an annular shroud ring 28 disposed around the rear end of the vehicle which controls the shape of the bubble or expansion chamber and minimizes it in the radial direction, which as previously referred to, should be minimized to the smallest cross section which would still apply force to the entire cross section of the vehicle.

The source of gas pressure should preferably be 4 to 20 times the depth pressure, that is, the ratio of the pressure within a bubble at the time the valve closes to the expanded pressure should be between 4 and 20 to 1. The frequency of formation of the bubbles is preferable between 10 and 60 per second. As will be apparent, this rapid application of thrust forces produces substantially constant velocity of the vehicle.

In the invention, so far described, it has been assumed that the gas employed is non-condensable. Condensable gases may, however, be employed where the noise produced by the imploding bubbles is not objectionable. One of the advantages of a condensable gas is increase in propulsive efficiency, particularly at great depths of vehicle submergence and permitting lower pressure ratios.

As so far described it has been assumed that the gas pressure within the bubble is the only force propelling the vehicle. It will now become apparent, however, that the pressure within the bubble is also transmitted to the water adjacent to it and this pressurized water may act on a portion of the vehicle cross section to provide propulsion force. Thus, the propulsion force is the pressure within the bubble times the area of the cross section engulfed within the bubble plus the pressure of the surrounding water times the area in which the pressurized water is in contact with.

Obviously many modifications and variations of the present invention are possible in the light of the above teachings. It is therefore to be understood that within the scope of the appended claims the invention may be practiced otherwise than as specifically described.

What is claimed is:

1. Apparatus for propelling a body submerged in water comprising:
    (a) means for delivering a pulse of gas under pressure from the body at a locus surrounding the body adjacent its rear end until a bubble of desired size is formed in ambient water,
    (b) means for terminating delivery of the gas to thereby permit the bubble to expand until a desired cross section of the rear end of the body is engulfed by the bubble, the gas under pressure within the bubble pressurizing the water adjacent thereto, whereby the gas under pressure within the bubble and the pressurized water adjacent thereto act upon another desired cross section of the body, propelling it forward,
    (c) the bubble thence further expanding to substantially depth pressure while continuing propelling the body by gas and water pressure,
    (d) the body thence coasting for a predetermined period under its inertia of motion, and
    (e) means for operating said first and second named means at substantially equally spaced intervals of time, whereby the trailing expanded bubbles are spaced apart and out of communication with each other.

2. Apparatus in accordance with claim 1 wherein said body is a torpedo.

3. Apparatus in accordance with claim 1 wherein said body is a propulsion pod attached to a surface boat.

4. Apparatus in accordance with claim 1 wherein said body is a submerged hydrofoil attached to a boat adapted to move above the surface of the water.

5. Apparatus in accordance with claim 1 wherein said body is a propeller adapted to be rotated by the pulses of gas.

6. Apparatus in accordance with claim 1 including an annular shroud ring surrounding the body rearwardly of said locus, adapted to minimize expansion of the gas in radially outward directions, whereby optimum expansion of the gas occurs in the direction of movement of the body and the opposite direction of movement of the same.

7. Apparatus in accordance with claim 1 wherein the gas is non-condensable.

8. Apparatus in accordance with claim 1 wherein the gas is condensable.

9. Apparatus in accordance with claim 1 wherein the first named means delivers pressure to the bubble, during its formation, at a pressure between 4 and 20 times the pressure in the bubble after expansion, and operates at a frequency such that bubbles are formed at the rate of between 10 and 60 per second.

References Cited by the Examiner
UNITED STATES PATENTS

| | | | |
|---|---|---|---|
| 808,634 | 1/1906 | Carlson | 115—11 |
| 1,190,755 | 7/1916 | Hahn | 170—172 |
| 1,338,115 | 4/1920 | Trotta | 60—35.5 |
| 2,372,030 | 3/1945 | Stalker | 170—135.4 |
| 2,692,742 | 10/1954 | Schwarzmayr | |
| 2,923,124 | 2/1960 | Mendez-Llamozas | 60—35.5 |
| 2,989,937 | 6/1961 | Rondot | 170—135 X |
| 2,995,317 | 8/1961 | Schoppe | 60—35.5 X |
| 3,016,865 | 1/1962 | Eichenberger | 114—67 |
| 3,046,732 | 6/1962 | Foa | 60—35.3 X |
| 3,109,495 | 11/1963 | Lang | 170—135.4 |

FOREIGN PATENTS

| | | |
|---|---|---|
| 1,294,727 | 4/1962 | France. |
| 715,880 | 9/1954 | Great Britain. |
| 762,325 | 11/1956 | Great Britain. |
| 124,058 | 2/1949 | Sweden. |
| 124,583 | 4/1949 | Sweden. |

SAMUEL LEVINE, *Primary Examiner.*

JULIUS E. WEST, *Examiner.*

E. A. POWELL, JR., *Assistant Examiner.*